(12) United States Patent
Yum et al.

(10) Patent No.: US 10,988,037 B2
(45) Date of Patent: Apr. 27, 2021

(54) VEHICLE AND METHOD FOR CONTROLLING THE SAME

(71) Applicants: Hyundai Motor Company, Seoul (KR); Kia Motors Corporation, Seoul (KR)

(72) Inventors: Seungjae Yum, Seoul (KR); Seungwan Son, Gyeonggi-do (KR); Jungsoo Park, Incheon (KR); Won Young Jeong, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 364 days.

(21) Appl. No.: 16/209,591

(22) Filed: Dec. 4, 2018

(65) Prior Publication Data

US 2019/0329661 A1 Oct. 31, 2019

(30) Foreign Application Priority Data

Apr. 30, 2018 (KR) .......................... 10-2018-0049841

(51) Int. Cl.
*B60L 53/00* (2019.01)
*G05B 13/04* (2006.01)
*B60L 58/13* (2019.01)

(52) U.S. Cl.
CPC .............. *B60L 53/00* (2019.02); *B60L 58/13* (2019.02); *G05B 13/048* (2013.01); *B60L 2230/22* (2013.01); *B60L 2240/622* (2013.01); *B60L 2240/665* (2013.01)

(58) Field of Classification Search
CPC ...... B60L 53/00; B60L 58/13; B60L 2230/22; B60L 2240/622; B60L 2240/665; G05B 13/048
USPC ........................................................ 701/22
See application file for complete search history.

(56) References Cited

U.S. PATENT DOCUMENTS

2019/0248243 A1* 8/2019 Gaither .................. B60L 8/003

\* cited by examiner

*Primary Examiner* — Gertrude Arthur Jeanglaude
(74) *Attorney, Agent, or Firm* — Mintz Levin Cohn Ferris Glovsky and Popeo, P.C.; Peter F. Corless

(57) ABSTRACT

A vehicle can include: a solar charging panel mounted to the vehicle and configured to acquire solar energy for charging a battery of the vehicle; a communication module configured to collect weather information and date-and-time information at a plurality of positions along a traveling path from an origin to a destination; a storage configured to store road information; and a controller configured to calculate a solar charging energy of the traveling path by predicting a maximum solar charging energy to be charged through the solar charging panel based on the weather information collected at the plurality of positions along the traveling path, and to calculate a solar charging prediction amount based on the date-and-time information collected at the plurality of positions along the traveling path, an amount by which to reduce the solar charging energy determined according to the stored road information relating to the traveling path, and the predicted maximum solar charging energy.

19 Claims, 11 Drawing Sheets

VEHICLE AND METHOD FOR CONTROLLING THE SAME

CROSS-REFERENCE TO RELATED APPLICATION

This application is based on and claims the benefit of priority under 35 U.S.C. § 119 to Korean Patent Application No. 10-2018-0049841, filed on Apr. 30, 2018 in the Korean Intellectual Property Office, the disclosure of which is incorporated herein by reference in its entirety.

BACKGROUND

1. Technical Field

Embodiments of the present disclosure relate to a vehicle and a method for controlling the same and, more particularly, to a vehicle capable of predicting a charging amount of solar energy specific to a traveling path of the vehicle and a method for controlling the same.

2. Description of the Related Art

Some modern vehicles utilize a solar charging apparatus in which a solar charging panel can be mounted on an upper surface of the vehicle. These vehicles can utilize solar energy irradiated from the sun via the mounted solar charging panel to at least partially power the vehicle during travel.

Conventionally, solar charging technology for vehicles uses position information and weather information, often identified using a global positioning system (GPS) device, and predicts a charging power based on the identified position information and weather information. However, predicting the charging amount of solar energy using only weather information and position information, as well as basic statistical data based on date and time, can be difficult and result in poor accuracy. Therefore, problems may occur when utilizing the charging amount of solar energy as the main power source of the vehicle.

SUMMARY

Therefore, it is an aspect of the present disclosure to provide a vehicle capable of predicting a charging amount of solar energy specific to a traveling path of the vehicle by utilizing GPS, weather information, and external geographical information relating to a path, and a method for controlling the same.

Additional aspects of the disclosure will be set forth in part in the description which follows and, in part, will be apparent from the description, or may be learned by practice of the disclosure.

In accordance with embodiments of the present disclosure, a vehicle can include: a solar charging panel mounted to the vehicle and configured to acquire solar energy for charging a battery of the vehicle; a communication module configured to collect weather information and date-and-time information at a plurality of positions along a traveling path from an origin to a destination; a storage configured to store road information; and a controller configured to calculate a solar charging energy of the traveling path by predicting a maximum solar charging energy to be charged through the solar charging panel based on the weather information collected at the plurality of positions along the traveling path, and to calculate a solar charging prediction amount based on the date-and-time information collected at the plurality of positions along the traveling path, an amount by which to reduce the solar charging energy determined according to the stored road information relating to the traveling path, and the predicted maximum solar charging energy.

The solar charging prediction amount may indicate an amount of solar energy that can be charged while the vehicle travels along the traveling path from the origin to the destination.

The controller may calculate the amount by which to reduce the solar charging energy based on an identification of at least one of a downtown and a highway along the traveling path.

The controller may calculate the solar charging energy by applying a prediction model to a section of the traveling path in which solar charging is impossible.

The controller may update a prediction model based on a comparison of the predicted maximum solar charging energy with an actual solar charging energy while the vehicle travels.

The controller may apply an error value to the prediction model based on a comparison of the actual solar charging energy charged in real-time while the vehicle travels with a prediction value relating to a traveling condition.

The controller may extend a travel distance of the vehicle based on the solar charging prediction amount and a predetermined reference of the solar charging prediction amount.

The controller may control a state of charge (SOC) of the battery so as to prevent the vehicle from traveling according to the solar charging prediction amount when the vehicle has parked.

The controller may charge the battery using the solar charging energy.

Furthermore, in accordance with embodiments of the present disclosure, a method for controlling a vehicle can include: determining a traveling path from an origin to a destination; acquiring solar energy for charging a battery of the vehicle using a solar charging panel mounted to the vehicle; calculating a solar charging energy of the traveling path; calculating a traveling time of the vehicle along the traveling path; and calculating a solar charging prediction amount based on the solar charging energy and the traveling time.

The calculating of the solar charging energy may further include: collecting weather information and date-and-time information at a plurality of positions along the traveling path using a communication module; predicting a maximum solar charging energy to be charged through the solar charging panel based on weather information collected at the plurality of positions along the traveling path; determining an amount by which to reduce the solar charging energy based on stored road information relating to the traveling path; and applying the amount by which to reduce the solar charging energy to the predicted maximum solar charging energy.

The method may further include identifying whether the traveling road is a downtown area; and applying the reduction amount by the downtown area to the maximum solar charging energy when the traveling road is the downtown area.

The method may further include identifying whether a road along the traveling path is in a section in which solar charging is impossible; and applying a minimum solar charging energy to the section when the road is in the section in which solar charging is impossible.

The solar charging prediction amount may indicate an amount that can be charged while the vehicle travels along the traveling path from the origin to the destination.

The method may further include: after the calculating of the solar charging prediction amount, updating a prediction model based on a comparison of the solar charging prediction amount with an actual solar charging energy while the vehicle travels.

The method may further include: applying an error value to the prediction model based on a comparison of the actual solar charging energy charged in real-time while the vehicle travels with a prediction value relating to a traveling condition.

The method may further include: after the calculating of the solar charging prediction amount, extending a travel distance of the vehicle based on the solar charging prediction amount and a predetermined reference of the solar charging prediction amount.

The method may further include: after the calculating of the solar charging prediction amount, controlling a state of charge (SOC) of the battery so as to prevent the vehicle from traveling according to the solar charging prediction amount.

The method may further include: after the calculating of the solar charging prediction amount, charging the battery using the solar charging energy.

BRIEF DESCRIPTION OF THE DRAWINGS

These and/or other aspects of the disclosure will become apparent and more readily appreciated from the following description of the embodiments, taken in conjunction with the accompanying drawings of which.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

Hereinafter, embodiments of the present disclosure will be described in detail with reference to the accompanying drawings. As those skilled in the art would realize, the described embodiments may be modified in various different ways, all without departing from the spirit or scope of the present disclosure. Further, throughout the specification, like reference numerals refer to like elements. Not all elements of embodiments of the present disclosure will be described, and description of what are commonly known in the art or what overlap each other in the embodiments will be omitted.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

The terms as used throughout the specification, such as "~ part", "~ module", "~ member", "~ block", etc., may be implemented in software and/or hardware, and a plurality of "~ parts", "~ modules", "~ members", or "~ blocks" may be implemented in a single element, or a single "~ part", "~ module", "~ member", or "~ block" may include a plurality of elements.

It will be further understood that the term "connect" or its derivatives refer both to direct and indirect connection, and the indirect connection includes a connection over a wireless communication network.

The term "include (or including)" or "comprise (or comprising)" is inclusive or open-ended and does not exclude additional, unrecited elements or method steps, unless otherwise mentioned.

It will be understood that, although the terms first, second, third, etc., may be used herein to describe various elements, components, sections, layers and/or sections, these elements, components, sections, layers and/or sections should not be limited by these terms. These terms are only used to distinguish one element, component, section, layer or section from another section, layer or section.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. The controller may control operation of units, modules, parts, or the like, as described herein. Moreover, it is understood that the below methods may be executed by an apparatus comprising the controller in conjunction with one or more other components, as would be appreciated by a person of ordinary skill in the art.

Reference numerals used for method steps are merely used for convenience of explanation, but not to limit an order of the steps. Thus, unless the context clearly dictates otherwise, the written order may be practiced otherwise.

Hereinafter, operating principles and embodiments of the present disclosure will be described with reference to the accompanying drawings.

Figure 1:
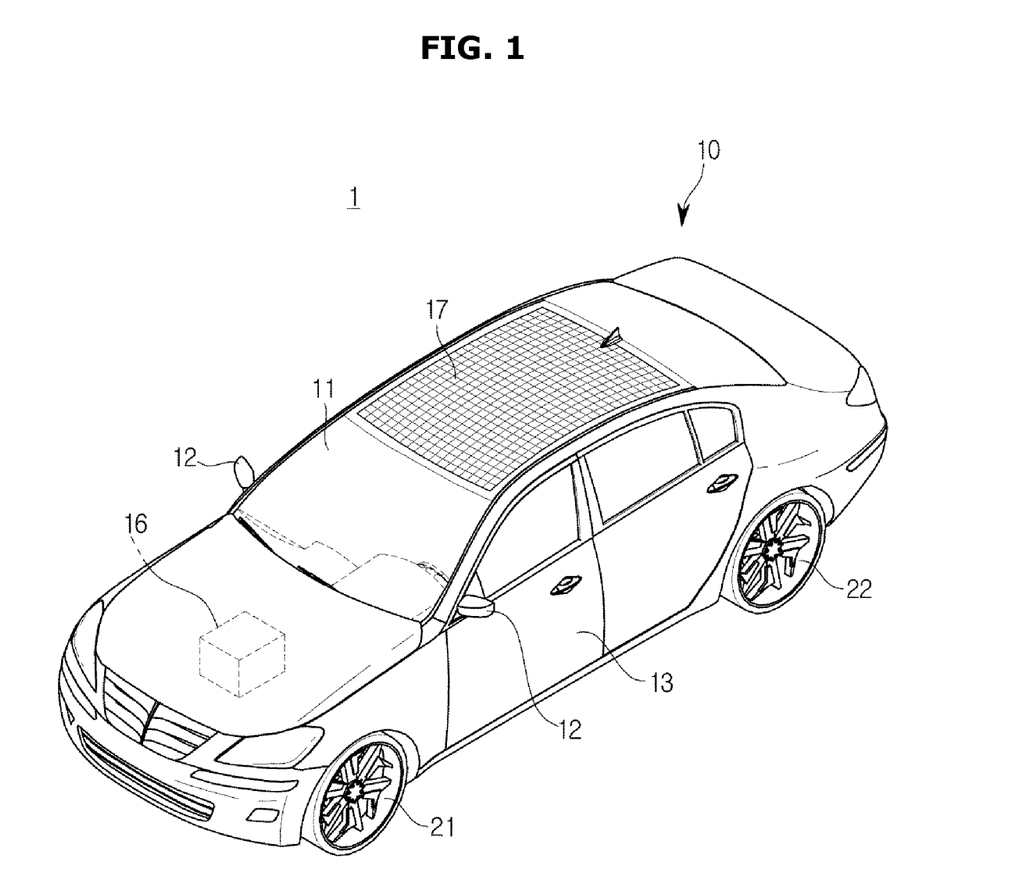
FIG. 1 is a view illustrating an exterior of a vehicle.

FIG. 1 is a view illustrating an exterior of a vehicle. The vehicle may be an electric or hybrid electric vehicle, although the vehicle is not limited as such.

As shown in FIG. 1, an exterior of vehicle 1 may include a body 10 forming the exterior appearance of the vehicle 1, a windscreen 11 providing a front view of the vehicle 1 to a driver, a side mirror 12 providing a view of a rear side of the vehicle 1 to the driver, a door 13 closing the inside of the vehicle 1 from the outside, and vehicle wheels 21 and 22 moving the vehicle 1 by including a front wheel 21 disposed on a front side of the vehicle and a rear wheel 22 disposed on a rear side of the vehicle.

The windscreen 11 may be provided on an upper portion of the front of the body 10 to allow a driver inside the vehicle 1 to acquire visual information about the front of the vehicle 1. The side mirror 12 may include a left side mirror provided on the left side of the body 10 and a right side mirror provided on the right side of the body 10, and may allow a driver inside the vehicle 1 to acquire visual information of the lateral side and the rear side of the vehicle 1.

The door 13 may be rotatably provided on a right side and a left side of the body 10. When the door 13 is opened, a driver may be allowed to be seated in the vehicle 1, and when the door 13 is closed, the inside of the vehicle 1 may be closed from the outside.

In addition to above mentioned components, the vehicle 1 may include a driving device (not shown) configured to rotate the wheels 21 and 22, a steering system (not shown) configured to change the driving direction of the vehicle 1, and a brake system (not shown) configured to stop the driving of the wheels.

The driving device (not shown) may supply a torque to the front wheel 21 or the rear wheel 22 so that the body 10 may be moved back and forth. The driving device (not shown) may include an engine configured to generate a torque by burning the fossil or a motor configured to generate a torque by receiving the power from a battery (not shown).

The steering system may include a steering wheel 42 (see FIG. 2) receiving a driving direction from a driver, a steering gear (not shown) changing a rotary motion of the steering wheel to a reciprocating motion, and a steering link (not shown) delivering the reciprocating motion of the steering gear (not shown) to the front wheel 21. Accordingly, the steering system may change the driving direction of the vehicle 1 by changing the direction of the rotary axis of the wheels.

The brake system may include a brake pedal (not shown) receiving a brake operation from a driver, a brake drum (not shown) coupled to the wheels 21 and 22, and a brake shoe (not shown) stopping the rotation of the brake drum (not shown) by using friction force. Accordingly, the brake system may stop the driving of the vehicle 1 by stopping the rotation of the wheels 21 and 22.

A solar charging panel 17 may be mounted in a roof of the vehicle 1 as a configuration for charging a solar energy, and the mounting position is not limited thereto. A detailed description thereof will be given later.

It is understood that the exterior of the vehicle 1, as described above and shown in FIG. 1, is provided merely for demonstration purposes and does not limit the scope of the present disclosure.

Figure 2:
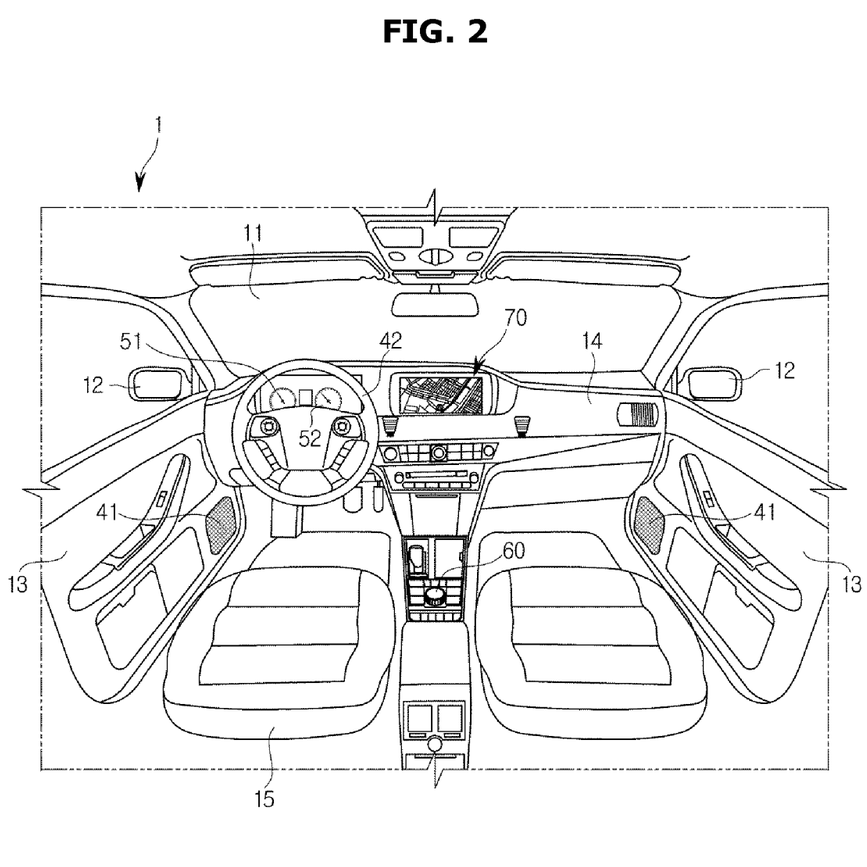
FIG. 2 is a view illustrating an interior of the vehicle.

FIG. 2 is a view illustrating an interior of the vehicle 1.

As shown in FIG. 2, the interior of the vehicle 1 may include a dashboard 14 in which a variety of devices are installed to allow a driver to operate the vehicle 1, a driver seat 15 in which the driver is seated, a cluster display 51 and 52 configured to display operation information of the vehicle 1, and a navigation system 70 configured to perform an audio function and a video function as well as a navigation function guiding a traveling path from a origin to a destination in response to an operation command of the driver.

The dashboard 14 may protrude from a lower side of the windscreen 11 to the driver so that the driver may operate a variety of devices installed in the dashboard 14 while staring at the front.

The driver seat 15 may be provided in a rear side of the dashboard 14 so that the driver may drive the vehicle 1 in a stable position while staring at the front and the variety of devices of the dashboard 14.

The cluster display 51 and 52 may be provided in the driver seat 15 of the dashboard 14 and include a speedometer 51 indicating a driving speed of the vehicle 1 and a revolutions per minute (RPM) gauge 52 indicating a rotation speed of a driving device (not shown).

The navigation system 70 may include a display displaying road information related to the traveling road of the vehicle 1 or a path to a destination; and a speaker 41 outputting a sound according to an operation command of the driver. In recent, an audio video navigation (AVN) device has been developed such that an audio device, a video device and a navigation are integrally formed and installed in a vehicle.

The navigation system 70 may be installed in a center fascia. The center fascia may represent a control panel between a driver seat and a passenger seat in the dash board 14, and may represent a portion in which the dash board 14 and a shift lever are vertically joined. In addition, an air conditioning device, a heater controller, a blowing port, a cigar jack, an ashtray, and a cup holder as well as the navigation system 70 may be installed in the center fascia. The center fascia together with a center console may distinguish between the driver seat and the passenger seat.

The vehicle 1 may have an additional jog dial 60 to operate a variety of devices including the navigation system 70.

According to the present disclosure, the jog dial 60 may perform an operation by being rotated or pressed, and may be provided with a touch pad having a touch recognition function to perform a handwriting recognition by using the user's finger or an additional device having a touch recognition function.

Figure 3:
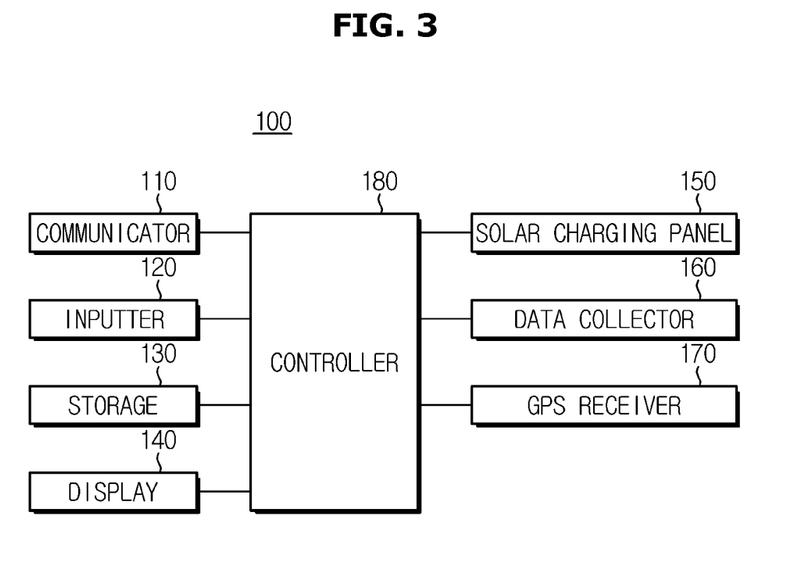
FIG. 3 is a control block diagram illustrating a configuration of the vehicle in detail.
Figure 4:
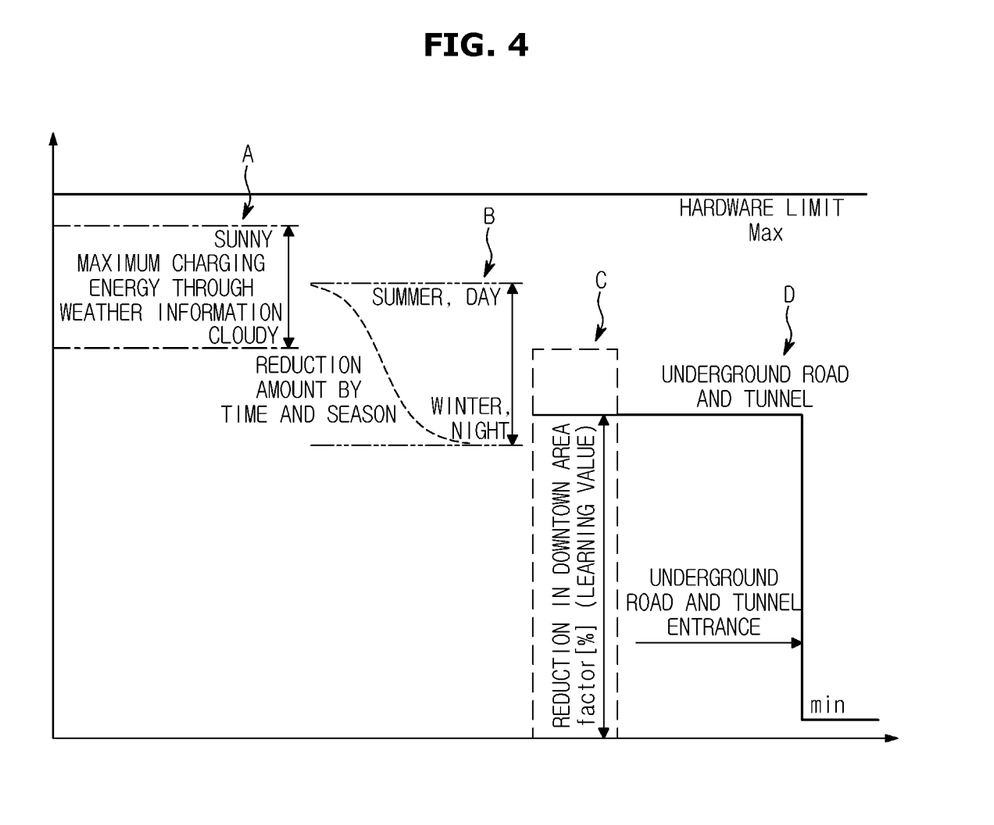
FIGS. 4 to 6 are views illustrating a method of predicting charging amount of solar energy.
Figure 5:
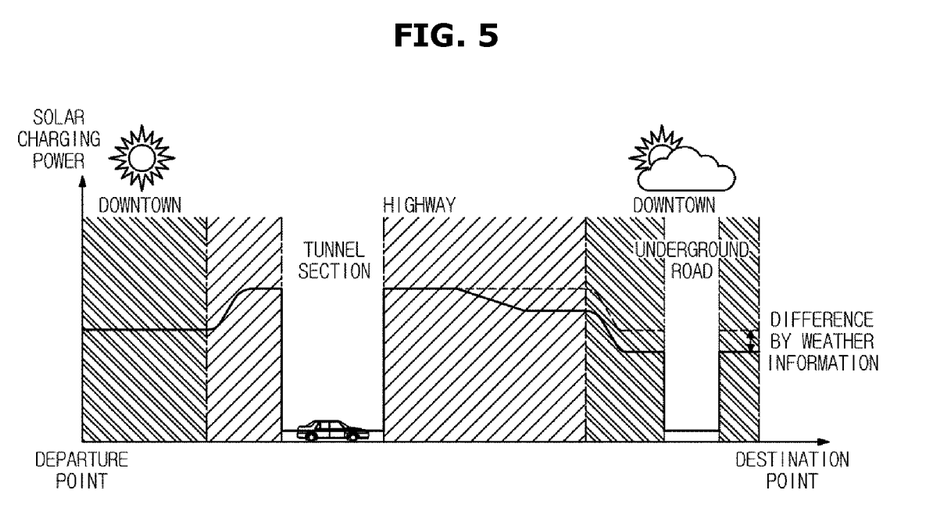
Figure 6:
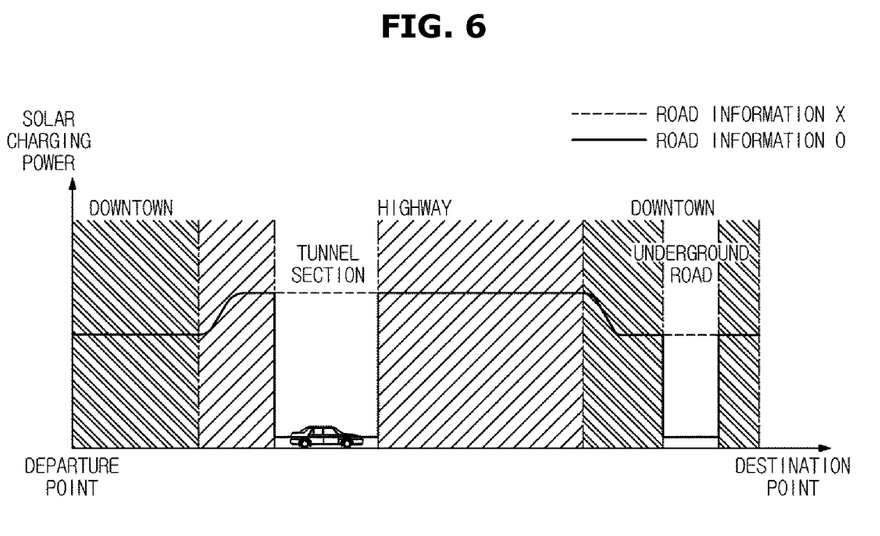
Figure 7:
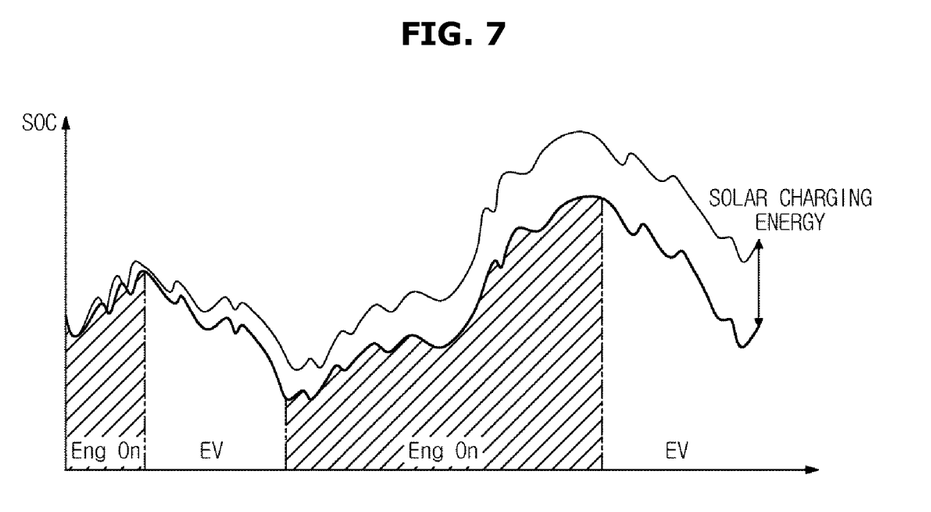
FIGS. 7 and 8 are views illustrating a method of utilizing the charging amount of solar energy.
Figure 8:
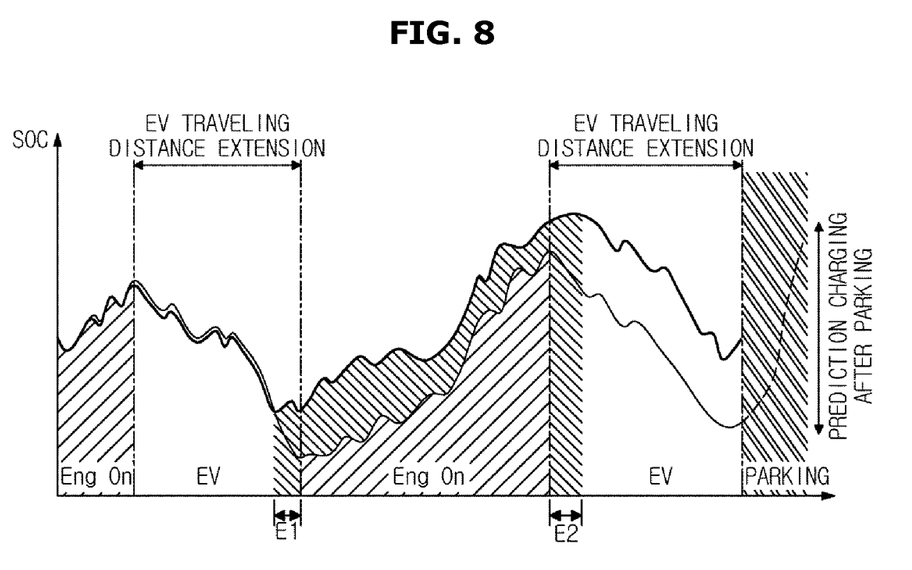

It is understood that the interior of the vehicle 1, as described above and shown in FIG. 2, is provided merely for demonstration purposes and does not limit the scope of the present disclosure FIG. 3 is a control block diagram illustrating a configuration of the vehicle in detail; FIGS. 4 to 6 are views illustrating a method of predicting charging amount of a solar energy; and FIGS. 7 and 8 are views illustrating a method of utilizing the charging amount of a solar energy.

Referring first to FIG. 3, a vehicle 100 (e.g., vehicle 1) may include a communicator 110, an inputter 120, a storage 130, a display 140, a solar charging panel 150, a data collector 160, a GPS receiver 170, and a controller 180.

The communicator 110 may include one or more components for enabling communication with an external device (e.g., a remote server). For example, the communicator 110 may include at least one of a short-range communication module, a wired communication module, and a wireless communication module.

The short-range communication module may include various kinds of short-range communication modules, such as a Bluetooth module, an infrared communication module, a Radio Frequency Identification (RFID) communication module, a Wireless Local Access Network (WLAN) communication module, a Near Field Communication (NFC) module, a Zigbee communication module, and the like, which transmit/receive signals through a wireless communication network at a short range.

The wired communication module may include various cable communication modules, such as a Universal Serial Bus (USB), a High Definition Multimedia Interface (HDMI), a Digital Visual Interface (DVI), Recommended Standard-232 (RS-232), power line communication, Plain Old Telephone Service (POTS), and the like, as well as various kinds of wired communication modules, such as a Controller Area Network (CAN) communication module, a Local Area Network (LAN) module, a Wide Area Network (WAN) module, a Value Added Network (VAN) module, and the like.

The wireless communication module may include wireless communication modules supporting various wireless communication methods, such as Global System for Mobile Communication (GSM), Code Division Multiple Access (CDMA), Wideband Code Division Multiple Access (WCDMA), Universal Mobile Telecommunications System (UMTS), Time Division Multiple Access (TDMA), Long Term Evolution (LTE), and the like, as well as a Radio Data System-Traffic Message Channel (RDS-TMS), Digital Multimedia Broadcasting (DMB), a Wireless-Fidelity (Wi-Fi) module, and a Wireless Broadband module.

The wireless communication module may include a wireless communication interface including an antenna and a receiver to receive traffic information signals. Also, the wireless communication module may further include a traffic-information signal conversion module to demodulate an analog radio signal received through the wireless communication interface into a digital control signal.

Meanwhile, the communicator 110 may further include an internal communication module (not shown) for communication between electric components in the vehicle 100. The vehicle 100 may use an internal communication protocol, such as Controller Area Network (CAN), Local Interconnection Network (LIN), FlexRay, and Ethernet.

The inputter 120 may be configured to input various information related to the vehicle 100 including a destination, and may be implemented integrally with or separately from the navigation.

The inputter 120 may include a hardware device, such as various buttons or switches, a pedal, a keyboard, a mouse, a track-ball, various kinds of levers, a handle, and a stick, for a user's inputs.

Also, the inputter 120 may include a Graphical User Interface (GUI) such as a touch pad, that is, a software device, for the user's inputs. The touch pad may be implemented as a Touch Screen Panel (TSP), and may be interlayered with the display 140.

The storage 130 may be configured to store various information related to the vehicle 100, including map information and road information for providing a traveling path in the navigation, and information collected by the data collector 160 (through the communication module of the communicator 110).

The storage 130 may be implemented as at least one of a non-volatile memory device (for example, a cache, ROM, PROM, EPROM, EEPROM, and flash memory), a volatile memory device (for example, RAM), or storage medium (for example, HDD and CD-ROM)), although not limited to these. The storage device 130 may be memory implemented as a separate chip from the processor described above in regard of the controller 180, or the storage 130 and the processor may be integrated into a single chip.

The display 140 may be configured to display various information related to an operation of the vehicle 100, including the traveling path.

The display 140 may be a Cathode Ray Tube (CRT), a Digital Light Processing (DLP) panel, a Plasma Display Panel (PDP), a Light Crystal Display (LCD) panel, an Electro Luminescence (EL) panel, an Electrophoretic Display (EPD) panel, an Electrochromic Display (ECD) panel, a Light Emitting Diode (LED) panel, or an Organic Light Emitting Diode (OLED) panel, although not limited to these.

The solar charging panel 150 may be configured to acquire solar energy for charging a battery of the vehicle 100.

The solar charging panel 150 may be configured to utilize a power generation system that converts the acquired solar energy directly into the power (current) by a solar cell, and the solar cell may be formed to convert a light energy into an electric energy. The solar cell is composed of a p-type semiconductor and an n-type semiconductor, and when the light is shined, an electric charge moves to generate a potential difference. When the solar cell is mounted on the roof of the vehicle, it may be possible to generate electric energy using natural light supplied from the sun. On the other hand, the position where the solar charging panel 150 is mounted on the vehicle 100 is not limited to the roof, and it may be mounted at any position of the vehicle 100 if it is capable of charging the battery.

The data collector 160 may be configured to collect meteorological information and date-and-time information at each position along a traveling path from an origin to a destination. The data collector 160 may receive weather information, date-and-time information, etc. from an external server (not shown) through the communication module of the communicator 110 as needed.

A Global Positioning System (GPS) receiver 170 may be configured to identify the position of the vehicle 100, and may receive signals from a GPS satellite and calculate a current position of the vehicle 100.

The controller 180 may predict a maximum solar charging energy to be charged through the solar charging panel 150 based on the weather information for a plurality of positions along the traveling path from the origin to the destination, and calculate a solar charging prediction amount by applying a season and time identified based on the date-and-time information, and an amount by which to reduce a solar charging energy (i.e., "reduction amount") identified based on the road information to the maximum solar charging energy.

That is, as shown in FIG. 4, the controller 180 may predict the maximum solar charging energy at 100% based on the best conditions for charging the solar energy, and calculate a more accurate the solar charge prediction amount by applying a factor (e.g., the time, the season, a reduction of urban area through a learning value, an underground road, a tunnel, etc.) that can to reduce the solar charging energy by a particular amount (i.e., an "reduction amount"). A detailed description thereof will be given later.

The controller 180 may calculate the solar charge prediction amount that can be charged during the traveling path from the origin to the destination.

Referring to FIG. 4, the controller 180 may calculate the maximum solar charging energy A that can be charged through the solar charging panel 150 based on the weather information for a plurality of positions along the traveling path. That is, the controller 180 may calculate the chargeable maximum solar charging energy A in consideration of only the weather information of each section on the traveling path from the origin to the destination.

Thereafter, the controller 180 may calculate an element capable of affecting charging of the solar charging energy by the influence of the time and the season as the reduction amount B of the solar charging energy.

In addition, the controller 180 may calculate an element capable of affecting charging of the solar charging energy as the reduction amount C, and D of the solar charging energy according to the traveling road information.

Particularly, the controller 180 may calculate the reduction amount of the solar charging energy based on the distinction information between a downtown and a highway, i.e., by distinguishing between a downtown area and a highway along the traveling path.

Referring to FIGS. 4 and 5, the controller 180 may identify whether the road on which the vehicle travels in the traveling path is a downtown area or a highway based on the road information, and calculate the amount by which to reduce (i.e., "reduction amount") the solar charging energy by predicting, for example, that the shadow of the building, shadow of various facilities, etc. acts as a reduction factor of the solar charging amount when the road is in the downtown area. At this time, the controller 180 may identify the position of the buildings, the various facilities, and the like based on the map information stored in the storage 130. Furthermore, when calculating the reduction amount of the solar charging energy, the controller 180 may apply a learning value of the reduction amount of the solar charging energy of the same path in the past.

In addition, the controller 180 may calculate the solar charging energy by applying a section in which solar charging is impossible in the traveling path to the prediction model.

For example, referring again to FIGS. 4 and 5, the controller 180 may identify whether there is the section in which the solar charging is impossible, such as an underground road or a tunnel, using the road information included in the map information, and allow the minimum charging energy to be applied to the section in which solar charging is impossible.

Meanwhile, as shown in FIG. 6, the controller 180 may also calculate the solar charging prediction amount without applying the section in which the solar charging is impossible. At this time, the controller 180 may omit the application of the minimum charging energy to the section in which the solar charging is impossible, such as a tunnel section, an underground road, and the like.

The controller 180 may predict the total charging power amount (i.e., the "solar charging prediction amount") by integrating the charging energy for each section calculated as described above as the traveling time.

The controller 180 may update the prediction model by comparing the predicted solar charging energy with an actual solar charging energy during travel. That is, the controller 180 may improve the accuracy of the charging energy prediction model using the past learning value based on the position information.

Particularly, the controller 180 may compare the actual solar charging energy charged in real-time while the vehicle 100 is traveling with the prediction value of the same traveling condition, and apply an error value to the prediction model.

The controller 180 may extend a travel distance of the vehicle based on the solar charging prediction amount and a predetermined reference by each solar charging prediction amount.

When the vehicle 100 is a hybrid vehicle, for example, the controller 180 may repeatedly turn on/off an engine of the vehicle to maintain a state of charge (SOC) of the vehicle in order to prevent deterioration of fuel consumption due to overdriving of the battery. When the solar energy is charged through the solar charging panel 150 as in the present disclosure, the solar charging energy may be generated as shown in FIG. 7. Referring to FIG. 8, the controller 180 may predict the power amount that is continuously charged while traveling, thereby shorting the engine on time and minimizing the fuel consumption. For example, the engine on time can be shortened by E1 and E2 in FIG. 8, and thus an EV travel distance can be extended.

The controller 180 may control a target amount of the SOC to be discharged during the traveling according to the solar charging prediction amount to be charged after the vehicle has parked, although the present disclosure is not limited as such. That is, the controller 180 may also control the SOC without considering the charging amount after the vehicle has parked.

Referring again to FIG. 8, the controller 180 may predict the power amount to be charged after the parking, and positively use the SOC up to the over-discharge state, thereby improving fuel economy.

The controller 180 may apply the solar charging energy to charge a high-voltage battery or a low-voltage battery. At this time, the high-voltage battery may be a battery that can be applied for driving the vehicle, and the low-voltage battery may be a battery that can be applied to an accessory of the vehicle such as a radio, an air conditioner, the navigation, although they are not limited as such.

As explained above, the controller 180 may be implemented with memory (not shown) to store data for algorithms for controlling the operations of components in the vehicle 100 or programs for executing the algorithms, and a processor (not shown) to perform the above-described operations using the data stored in the memory. The memory and the processor may be implemented as separate chips, or integrated into a single chip.

Figure 9:
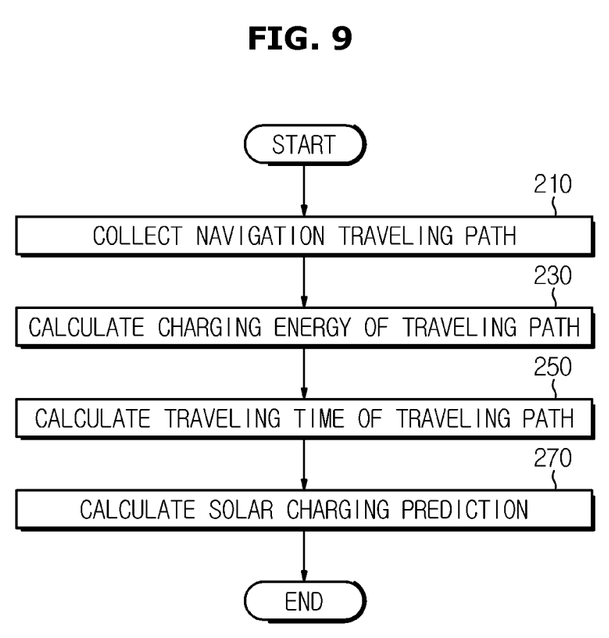
FIG. 9 is a flowchart illustrating a control method of the vehicle.
Figure 10:
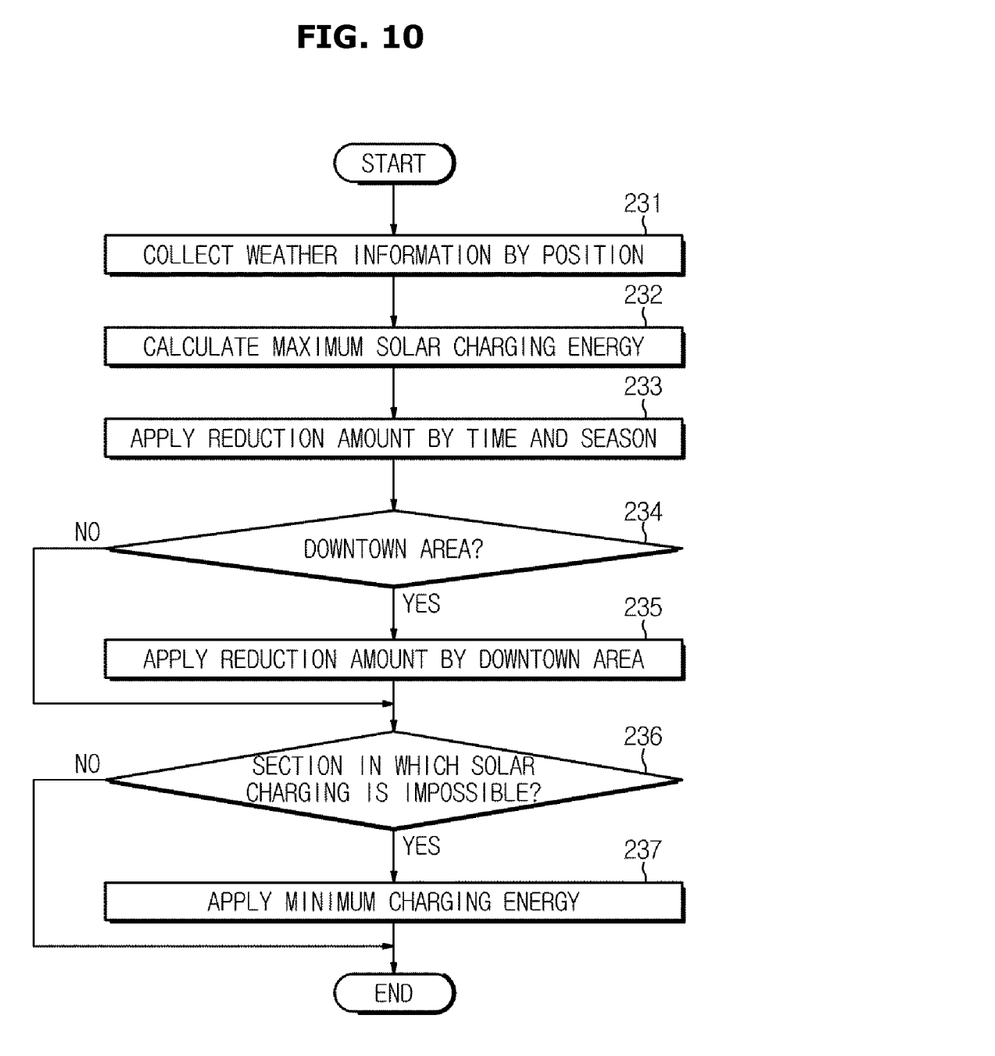
FIG. 10 is a flowchart illustrating in detail a method of calculating the charging energy of FIG. 9.

FIG. 9 is a flowchart illustrating a control method of the vehicle; and FIG. 10 is a flowchart illustrating in detail a method of calculating a charging energy of FIG. 9.

First, the vehicle 100 may determine the traveling path from an origin to a destination (210). The vehicle 100 may identify the traveling path from the origin to the destination based on the stored map information based on the destination inputted from the user.

Next, the vehicle 100 may calculate the solar charging energy of the traveling path (230).

Referring to FIG. 10, the vehicle 100 may predict the maximum solar charging energy to be charged through the solar charging panel based on the weather information for each position of a plurality of positions along the traveling path (231 and 232).

The vehicle 100 may apply the reduction amount of the solar charging energy by the season and the time identified based on the date-and-time information, to the maximum solar charging energy (233). Also, the vehicle 100 may apply the reduction amount of the solar charging energy, which is identified based on the road information from the origin to the destination, to the maximum solar charging energy. That is, the vehicle 100 may reduce the maximum solar charging energy according to the reduction amount.

Particularly, the vehicle 100 may identify whether the traveling road is in a downtown area (234). When the traveling road is identified as located in the downtown area, the vehicle 100 may apply the reduction amount by the downtown area to the maximum solar charging energy (235).

In addition, the vehicle 100 may identify whether the traveling road is the section in which the solar charging is impossible (236). When it is identified that the solar charging is impossible, the vehicle 100 may apply the minimum solar charging energy to the corresponding section, and apply it to the maximum solar charging energy (237). However, the step of applying the minimum solar charging energy for the section in which the solar charging is impossible, as the above-described steps 236 and 237 may be omitted according to the operator's need.

Next, the vehicle 100 may calculate the traveling time of the traveling path (250).

Next, the vehicle 100 may calculate the solar charging prediction amount based on the solar charging energy and the traveling time (270). At this time, the vehicle 100 may calculate the solar charging prediction amount that can be charged while the vehicle 100 travels along the traveling path from the origin to the destination.

Although not shown, after step 270, the vehicle 100 may extend the travel distance of the vehicle based on the solar charging prediction amount and the predetermined reference by the solar charging prediction amount.

When the vehicle 100 is a hybrid vehicle, the controller 180 may maintain the SOC of the vehicle by repeatedly turning the engine on/off so as to prevent the deterioration of the fuel economy due to the overdriving of the battery.

When solar energy is charged through the solar charging panel 150 as in the disclosed disclosure, the solar charging energy may be generated as shown in FIG. 7. Referring again to FIG. 8, the controller 180 may predict the power amount that is continuously charged during the traveling, thereby shorting the engine on time and minimizing the fuel consumption as compared to the conventional control techniques. For example, the engine on time can be shortened by E1 and E2 in FIG. 8, and thus the EV travel distance can be extended.

Also, although not shown, after step 270, the vehicle 100 may change a target amount of the SOC to be discharged during the traveling according to the solar charging prediction amount to be charged after the vehicle has parked, although the present disclosure is not limited as such. That is, the controller 180 may also control the SOC without considering the charging amount after the vehicle has parked.

Further, although not shown, after step 270, the vehicle 100 may apply the solar charging energy to the high voltage battery or the low voltage battery.

At this time, the high-voltage battery may be a battery that can be applied for driving the vehicle, and the low-voltage battery may be a battery that can be applied to the accessory of the vehicle such as the radio, the air conditioner, the navigation, and the like, although they are not limited as such.

Figure 11:
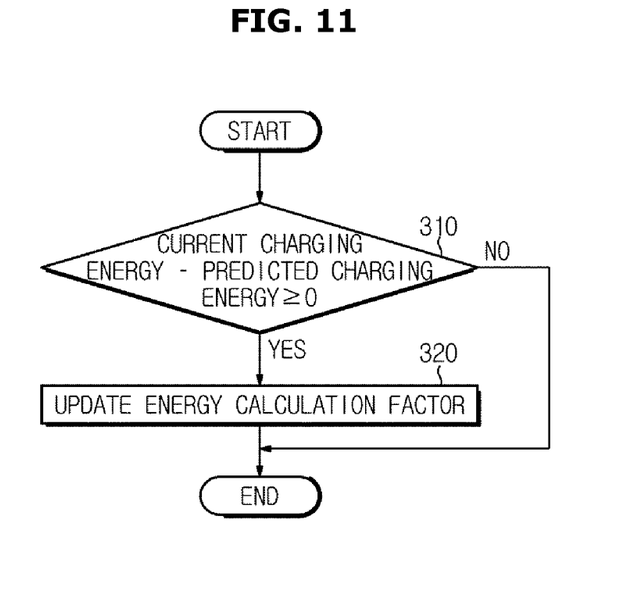
FIG. 11 is a flowchart illustrating a method of updating a charging energy calculation factor.

FIG. 11 is a flowchart illustrating a method of updating a charging energy calculation factor.

As shown in FIG. 11, the vehicle 100 may compare the predicted solar charging energy with the actual solar charging energy during traveling to update the prediction model (310, and 320).

The vehicle 100 may compare the actual solar charging energy (current charging energy in FIG. 11) charged in real-time during the traveling with the predicted value (predicted charging energy) of the same traveling condition to apply the error value to the prediction model.

Particularly, when the difference between the current charging energy and the predicted charging energy is greater than or equal to zero, the prediction model which is the charging energy calculation factor may be updated.

The above-described steps 310 and 320 may be performed after step 270 of FIG. 9, although the present disclosure is not limited as such.

As is apparent from the above description, a reliability of the accuracy of predicting the charging amount of solar energy specific to the traveling path of the vehicle can improve. Also, the total amount of the predicted charge can be used to enhance the fuel economy by actively utilizing the SOC control strategy of the vehicle. Also, since it is possible to predict a power to be charged after the vehicle parks, the fuel consumption of the vehicle can be improved by traveling in the discharge direction.

The embodiments of the present disclosure may be implemented in the form of recording media for storing instructions to be carried out by a computer. The instructions may be stored in the form of program codes, and when executed by a processor, may generate program modules to perform operation in the embodiments of the present disclosure. The recording media may correspond to computer-readable recording media. The computer-readable recording medium includes any type of recording medium having data stored thereon that may be thereafter read by a computer. For example, it may be a ROM, a RAM, a magnetic tape, a magnetic disk, a flash memory, an optical data storage device, etc.

The embodiments of the present disclosure have thus far been described with reference to accompanying drawings. It will be apparent to people of ordinary skill in the art that the present disclosure may be practiced in other forms than the embodiments as described above without changing the technical idea or essential features of the present disclosure. The above embodiments are only by way of example, and should not be interpreted in a limited sense.

What is claimed is:
1. A vehicle comprising:
a solar charging panel mounted to the vehicle and configured to acquire solar energy for charging a battery of the vehicle;
a communication module configured to collect weather information and date-and-time information at a plurality of positions along a traveling path from an origin to a destination;
a storage configured to store road information; and
a controller configured to calculate a solar charging energy of the traveling path by predicting a maximum solar charging energy to be charged through the solar charging panel based on the weather information collected at the plurality of positions along the traveling path, and to calculate a solar charging prediction amount based on the date-and-time information collected at the plurality of positions along the traveling path, an amount by which to reduce the solar charging energy determined according to the stored road information relating to the traveling path, and the predicted maximum solar charging energy.
2. The vehicle according to claim 1, wherein the solar charging prediction amount indicates an amount of solar energy that can be charged while the vehicle travels along the traveling path from the origin to the destination.

3. The vehicle according to claim 1, wherein the controller is further configured to calculate the amount by which to reduce the solar charging energy based on an identification of at least one of a downtown and a highway along the traveling path.

4. The vehicle according to claim 1, wherein the controller is further configured to calculate the solar charging energy by applying a prediction model to a section of the traveling path in which solar charging is impossible.

5. The vehicle according to claim 1, wherein the controller is further configured to update a prediction model based on a comparison of the predicted maximum solar charging energy with an actual solar charging energy while the vehicle travels.

6. The vehicle according to claim 5, wherein the controller is further configured to apply an error value to the prediction model based on a comparison of the actual solar charging energy charged in real-time while the vehicle travels with a prediction value relating to a traveling condition.

7. The vehicle according to claim 1, wherein the controller is further configured to extend a travel distance of the vehicle based on the solar charging prediction amount and a predetermined reference of the solar charging prediction amount.

8. The vehicle according to claim 1, wherein, the controller is further configured to control a target amount of a state of charge (SOC) of the battery to be discharged during traveling according to the solar charging prediction amount to be charged after parking.

9. The vehicle according to claim 1, wherein the controller is further configured to charge the battery using the solar charging energy.

10. A method for controlling a vehicle comprising:
    determining a traveling path from an origin to a destination;
    acquiring solar energy for charging a battery of the vehicle using a solar charging panel mounted to the vehicle;
    calculating a solar charging energy of the traveling path;
    calculating a traveling time of the vehicle along the traveling path; and
    calculating a solar charging prediction amount based on the solar charging energy and the traveling time.

11. The method according to claim 10, wherein the calculating of the solar charging energy comprises:
    collecting weather information and date-and-time information at a plurality of positions along the traveling path using a communication module;
    predicting a maximum solar charging energy to be charged through the solar charging panel based on weather information collected at the plurality of positions along the traveling path;
    determining an amount by which to reduce the solar charging energy based on stored road information relating to the traveling path; and
    applying the amount by which to reduce the solar charging energy to the predicted maximum solar charging energy.

12. The method according to claim 11, further comprising:
    identifying whether a road along the traveling path is a downtown area or a highway; and
    applying the amount by which to reduce the solar charging energy to the maximum solar charging energy when the traveling road is the downtown area.

13. The method according to claim 11, further comprising:
    identifying whether a road along the traveling path is in a section in which solar charging is impossible; and
    applying a minimum solar charging energy to the section when the road is in the section in which solar charging is impossible.

14. The method according to claim 10, wherein the solar charging prediction amount indicates an amount that can be charged while the vehicle travels along the traveling path from the origin to the destination.

15. The method according to claim 10, further comprising:
    after the calculating of the solar charging prediction amount, updating a prediction model based on a comparison of the solar charging prediction amount with an actual solar charging energy while the vehicle travels.

16. The method according to claim 15, further comprising:
    applying an error value to the prediction model based on a comparison of the actual solar charging energy charged in real-time while the vehicle travels with a prediction value relating to a traveling condition.

17. The method according to claim 10, further comprising:
    after the calculating of the solar charging prediction amount, extending a travel distance of the vehicle based on the solar charging prediction amount and a predetermined reference of the solar charging prediction amount.

18. The method according to claim 10, further comprising:
    after the calculating of the solar charging prediction amount, controlling a target amount of a state of charge (SOC) of the battery to be discharged during traveling according to the solar charging prediction amount to be charged after parking.

19. The method according to claim 10, further comprising:
    after the calculating of the solar charging prediction amount, charging the battery using the solar charging energy.

* * * * *